US010732065B2

(12) United States Patent
Inkpen et al.

(10) Patent No.: US 10,732,065 B2
(45) Date of Patent: Aug. 4, 2020

(54) APPARATUS AND METHOD OF DETECTING BREACHES IN PIPELINES

(71) Applicant: Instrumar Limited, St. John's (CA)

(72) Inventors: Stuart Inkpen, St. Phillips (CA); Chris Nolan, St. John's (CA); Bill Conway, St. John's (CA); Dana Linfield, St. Phillips (CA); David Bonnell, St. John's (CA); Joshua Swamidas, St. John's (CA)

(73) Assignee: Instrumar Limited, St. John's (CA)

( * ) Notice: Subject to any disclaimer, the term of this patent is extended or adjusted under 35 U.S.C. 154(b) by 235 days.

(21) Appl. No.: 15/780,697

(22) PCT Filed: Dec. 2, 2016

(86) PCT No.: PCT/CA2016/051423
§ 371 (c)(1),
(2) Date: Jun. 1, 2018

(87) PCT Pub. No.: WO2017/091907
PCT Pub. Date: Aug. 6, 2017

(65) Prior Publication Data
US 2018/0348079 A1  Dec. 6, 2018

Related U.S. Application Data

(60) Provisional application No. 62/263,605, filed on Dec. 4, 2015.

(51) Int. Cl.
*G01M 3/18* (2006.01)
*F17D 5/06* (2006.01)
(Continued)

(52) U.S. Cl.
CPC .................. *G01M 3/18* (2013.01); *F17D 5/06* (2013.01); *G01M 3/045* (2013.01); *F17D 5/02* (2013.01); *G01M 3/16* (2013.01)

(58) Field of Classification Search
CPC .......... F17D 5/02; G01M 3/16; G01N 1/2294; G01N 33/0047; G01N 33/241
See application file for complete search history.

(56) References Cited

U.S. PATENT DOCUMENTS 3,906,426 A * 9/1975 Frazee ................... G01N 27/12
338/35
4,805,070 A * 2/1989 Koontz ................... B32B 17/10
361/286

(Continued)

FOREIGN PATENT DOCUMENTS

DE   3215455 A1 * 11/1983
GB   2540260 A1 *  1/2017

*Primary Examiner* — David A Rogers
(74) *Attorney, Agent, or Firm* — Graham Patent Law (57) ABSTRACT

A pipeline breach monitor includes an electric field sensor and a signal processing unit in communication with the electric field sensor. The electric field sensor includes an upper substrate, and a plurality of electrodes embedded in the upper substrate. The electrodes are substantially parallel to each other in the upper substrate and comprise at least one sense electrode and a plurality of elongate sensor electrodes disposed around the at least one sense electrode. The signal processing unit is configured to (i) apply a voltage signal to the sensor electrodes, (ii) receive at least one measurement set comprising a measurement of a phase and a magnitude of a current generated in the at least one sense electrode and the sensor electrodes, and (iii) generate an assessment of accumulation of a substance proximate the electric field sensor from the at least one measurement set and at least one predetermined substance accumulation profile.

16 Claims, 8 Drawing Sheets

(51) Int. Cl.
*G01M 3/04* (2006.01)
*F17D 5/02* (2006.01)
*G01M 3/16* (2006.01)

(56) References Cited

U.S. PATENT DOCUMENTS

| | | | | |
|---|---|---|---|---|
| 4,807,707 A * | 2/1989 | Handley | | E21B 7/26 175/20 |
| 5,000,051 A * | 3/1991 | Bredemeier | | E21B 7/26 73/73 |
| 5,046,353 A * | 9/1991 | Thompson | | G01M 3/22 436/3 |
| 5,048,336 A * | 9/1991 | Sugihara | | G01N 27/18 338/35 |
| 5,065,019 A * | 11/1991 | Darilek | | G01N 21/64 250/253 |
| 5,150,622 A * | 9/1992 | Vollweiler | | B09C 1/00 175/20 |
| 5,179,347 A * | 1/1993 | Hawkins | | G01N 27/121 324/694 |
| 5,271,901 A * | 12/1993 | Issel | | F17D 5/02 405/129.5 |
| 5,334,189 A * | 8/1994 | Wade | | A61M 31/002 422/68.1 |
| 5,407,019 A * | 4/1995 | Lazarus | | E21B 21/16 175/50 |
| 5,503,031 A * | 4/1996 | Scott | | E21B 7/26 175/21 |
| 5,587,538 A * | 12/1996 | Bratton | | G01N 1/14 73/863.33 |
| 5,639,956 A * | 6/1997 | Christy | | G01N 33/24 73/19.01 |
| 5,783,743 A * | 7/1998 | Weber | | B60S 1/0822 29/610.1 |
| 5,889,217 A * | 3/1999 | Rossabi | | E02D 1/025 73/864.74 |
| 5,992,217 A * | 11/1999 | Jax | | F17D 5/06 73/40 |
| 6,025,725 A * | 2/2000 | Gershenfeld | | H01F 17/0006 324/652 |
| 6,175,310 B1 * | 1/2001 | Gott | | G01M 3/165 340/604 |
| 6,298,925 B1 * | 10/2001 | Lee | | E21B 7/205 166/264 |
| 6,308,563 B1 * | 10/2001 | Hubbell | | E21B 47/042 73/152.51 |
| 6,405,135 B1 * | 6/2002 | Adriany | | F17D 5/02 702/22 |
| 6,405,588 B1 * | 6/2002 | Hubbell | | E21B 49/00 166/113 |
| 6,526,807 B1 * | 3/2003 | Doumit | | G01M 3/04 340/605 |
| 6,601,440 B1 * | 8/2003 | Chuang | | A01G 25/167 73/73 |
| 6,608,489 B2 | 8/2003 | Yankielun et al. | | |
| 6,792,794 B2 * | 9/2004 | Bonne | | G01N 30/30 73/25.01 |
| 6,826,948 B1 * | 12/2004 | Bhatti | | G01M 3/188 340/605 |
| 7,183,779 B2 * | 2/2007 | Hughes | | G01N 33/246 324/664 |
| 7,281,439 B2 * | 10/2007 | Schmitt | | G01N 1/2294 73/19.1 |
| D618,567 S * | 6/2010 | Brooking | | D10/56 |
| 7,770,435 B2 * | 8/2010 | Issel | | G01M 3/18 73/40 |
| 7,788,970 B2 * | 9/2010 | Hitt | | A01G 25/167 73/73 |
| 7,802,465 B2 * | 9/2010 | Issel | | F17D 5/06 73/40.7 |
| 8,444,937 B2 * | 5/2013 | Tuli | | G01V 9/00 175/59 |
| 8,669,757 B2 | 3/2014 | Inkpen et al. | | |
| 8,736,281 B2 | 5/2014 | Lowe et al. | | |
| 9,863,833 B2 * | 1/2018 | Lee | | G01M 3/165 |
| 2002/0060576 A1 | 5/2002 | Tominaga | | G01N 27/048 324/715 |
| 2002/0144453 A1 * | 10/2002 | Su | | A01M 1/026 43/124 |
| 2003/0080199 A1 * | 5/2003 | Condreva | | A01G 25/167 239/63 |
| 2003/0094033 A1 * | 5/2003 | Gibbs | | G01M 3/16 73/40 |
| 2007/0046481 A1 * | 3/2007 | Vokey | | E04D 13/006 340/602 |
| 2007/0273390 A1 | 11/2007 | Champion et al. | | |
| 2008/0191716 A1 * | 8/2008 | Chen | | G01N 27/223 324/665 |
| 2010/0064773 A1 * | 3/2010 | Meredith | | G01M 3/047 73/40 |
| 2013/0271166 A1 | 10/2013 | Bouffard et al. | | |
| 2015/0247777 A1 * | 9/2015 | Kondou | | G01P 13/0073 73/49.1 |
| 2017/0350561 A1 * | 12/2017 | Wagg | | F16L 55/00 |
| 2019/0187086 A1 * | 6/2019 | Burkey | | H04W 84/20 |

* cited by examiner

APPARATUS AND METHOD OF DETECTING BREACHES IN PIPELINES

CROSS-REFERENCE TO RELATED APPLICATIONS

This patent application claims the benefit of the filing date of U.S. provisional patent application No. 62/263,605, filed Dec. 4, 2015, entitled "Apparatus and Method of Detecting Breaches in Pipelines", the contents of which are incorporated herein by reference.

FIELD

This patent application generally relates to a method and apparatus for detecting leakage of fluid from pipelines.

BACKGROUND

Petroleum-based fluids, such as natural gas and oil, are often transported vast distances via pipeline. Although pipelines offer petroleum producers with easy access to refineries and remote markets, breaches in pipelines can contaminate ground water, and marine and animal habitats. However, breaches in pipelines are often difficult to detect quickly, particularly if the pipelines cross rural properties where visual inspections may be infrequent.

SUMMARY

In one aspect, this patent application describes a pipeline breach monitor that includes an electric field sensor and a signal processing unit that is in communication with the electric field sensor. The electric field sensor includes a substantially planar insulating upper substrate, and a plurality of electrodes embedded in the upper substrate. The electrodes are substantially parallel to each other in the upper substrate and comprise at least one sense electrode and a plurality of elongate sensor electrodes disposed around the at least one sense electrode.

The signal processing unit is configured to (i) apply a voltage signal to the sensor electrodes, (ii) receive at least one measurement set comprising a measurement of a phase and a magnitude of an alternating current generated in the at least one sense electrode and the sensor electrodes in response to the voltage signal, and (iii) generate an assessment of accumulation of a substance proximate the electric field sensor from a correlation of the at least one measurement set with at least one predetermined substance accumulation profile.

In another aspect, this patent application describes a method of monitoring for a pipeline breach. The method involves a pipeline breach monitor generating varying time-varying electric fields in a region beneath a section of pipeline. The pipeline breach monitor includes an electric field sensor, and a signal processing unit that is in communication with the electric field sensor. The electric field sensor comprises a substantially planar insulating upper substrate and a plurality of electrodes embedded in the upper substrate. The electrodes are substantially parallel to each other in the upper substrate and comprise at least one sense electrode and a plurality of elongate sensor electrodes disposed around the at least one sense electrode.

The signal processing unit generates the time-varying electric fields by applying a voltage signal to the sensor electrodes. The signal processing unit also receives at least one measurement set comprising a measurement of a phase and a magnitude of an alternating current generating in the at least one sense electrode and the sensor electrodes from the time-varying electric fields, and generates an assessment of accumulation of a substance discharged from the pipeline from a correlation of the at least one measurement set with at least one predetermined substance accumulation profile.

In one implementation, the sense electrode(s) comprise(s) an elongate sense electrode, and the electric field sensor may include a guard electrode embedded in the upper substrate at opposite ends of the elongate sense electrode. A pair of the elongate sense electrodes may be substantially parallel to each other, and one of the elongate sensor electrodes may be parallel to and disposed between the elongate sense electrodes.

A continuous grounding conductor may be embedded in the upper substrate around the electrodes, and at least one elongate guard electrode may be embedded in the upper substrate between the elongate sensor electrodes and the grounding conductor, parallel to the sensor electrodes. The electric field sensor may be configured to generate a series of time-varying electric fields from the voltage signal, and the guard electrode and the grounding conductor may be configured to substantially confine the electric fields to proximate the electric field sensor.

A pair of the elongate sense electrodes may be disposed substantially parallel to each other. A pair of the elongate sensor electrodes may be substantially parallel to each other and disposed between one of the elongate guard electrodes and one of the elongate sense electrodes. Another pair of the elongate sensor electrodes may be substantially parallel to each other and disposed between another of the elongate guard electrodes and another of the elongate sense electrodes.

The electric field sensor may be configured to generate a time-series of electric fields from the voltage signal, the time-series of electric fields being configured to render the at least one measurement set distinctive of the accumulation of a particular substance.

In one implementation, the electric field sensor includes a substantially planar first intermediate substrate disposed below the upper substrate, and a plurality of conductive posts extending through the first intermediate substrate. The conductive posts are each in electrical contact with a respective one of the electrodes. A substantially planar second intermediate substrate may be disposed below the first intermediate substrate, and a plurality of conductive traces may be disposed on the second intermediate substrate. The conductive traces may each be in electrical contact with a respective one of the conductive posts and may extend parallel to the plurality of electrodes. A substantially planar insulating top substrate may be disposed over the plurality of electrodes, and vias may each be in electrical contact with a respective one of the conductive traces and extend through the top, upper and intermediate substrates.

Each substance accumulation profile may comprise a set of predetermined complex admittance measurements, and the signal processing unit may be configured to determine complex admittances from the voltage signal and from the phase and magnitude of the alternating current generated in the electric field sensor by the time-varying electric fields, and to generate the assessment of accumulation of a substance from a comparison of the determined complex admittances with the predetermined complex admittance measurements.

BRIEF DESCRIPTION OF THE DRAWINGS

The foregoing aspects will now be described, by way of example only, with reference to the accompanying drawings, in which.

DETAILED DESCRIPTION

Pipeline Breach Monitor: Overview

Figure 1:
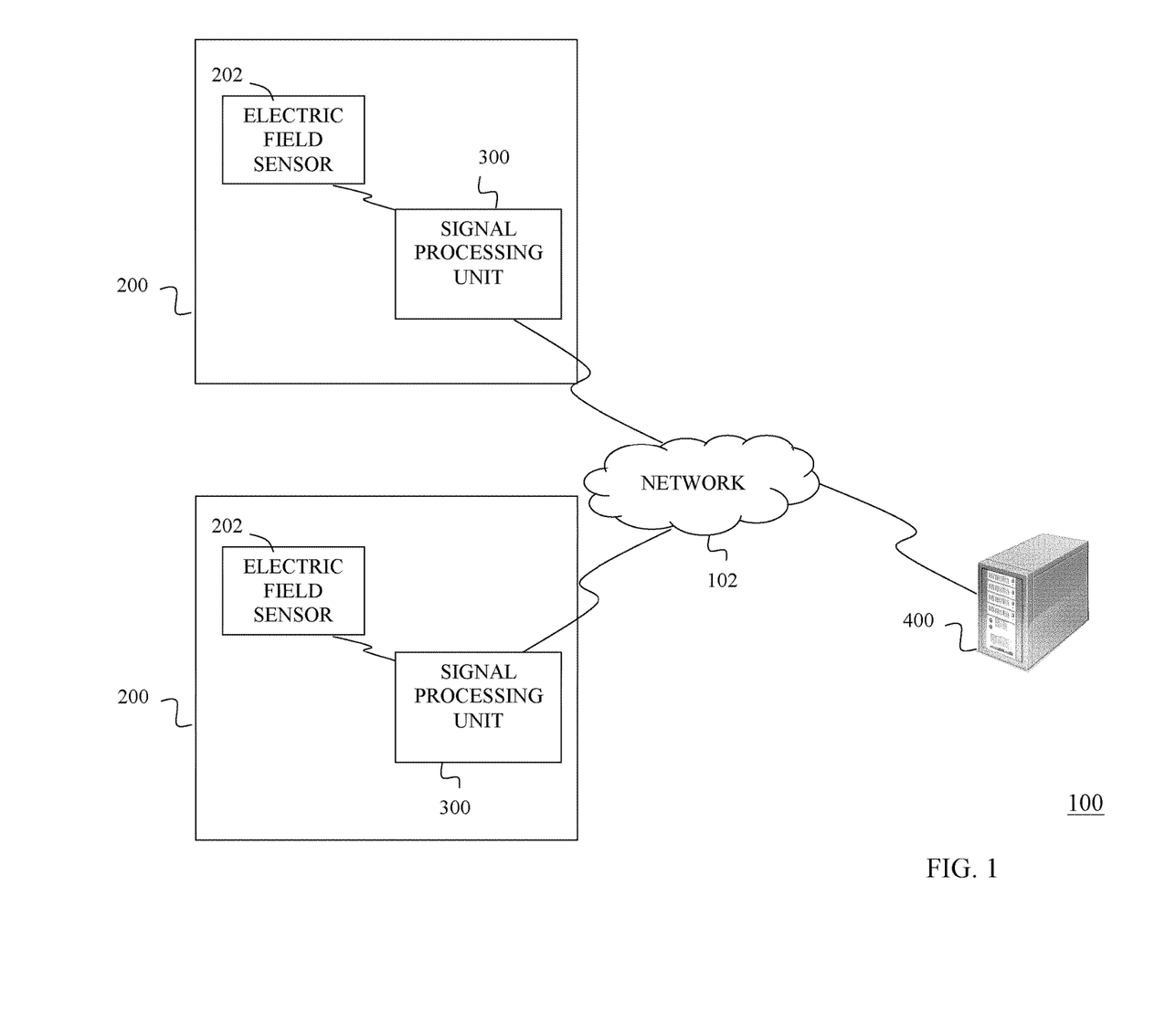
FIG. 1 is a schematic view of the pipeline breach monitor, depicting the electric field sensor units and a sensor monitor.

Turning now to FIG. 1, there is shown a pipeline breach monitor, denoted generally as 100, comprising one or more electric field sensor units 200, a sensor monitor 400, and a local area network 102 interconnecting the electric field sensor unit(s) 200 and the sensor monitor 400.

Electric Field Sensor Units

The electric field sensor units 200 are typically disposed underground, each beneath a respective section of pipeline, and are configured to monitor for the accumulation of a substance that might have leaked or been discharged from the pipeline. Typically, the monitored substance is a liquid hydrocarbon, such as oil, and the electric field sensors 202 are configured to monitor for its accumulation from the respective section of pipeline.

Each electric field sensor unit 200 includes an electric field sensor 202 and a signal processing unit (SPU) 300. As will be explained, the electric field sensor 202 produces a time-varying electric field, which generates alternating current signals in the electric field sensor 202, the magnitude and phase of which depend on the characteristics of substances proximate the electric field sensor 202. The SPU 300 generates assessments of the accumulation of substances proximate the electric field sensor 202 from the magnitude and phase of the alternating current signals, and transmits the substance accumulation assessments to the sensor monitor 400.

Figure 2A:
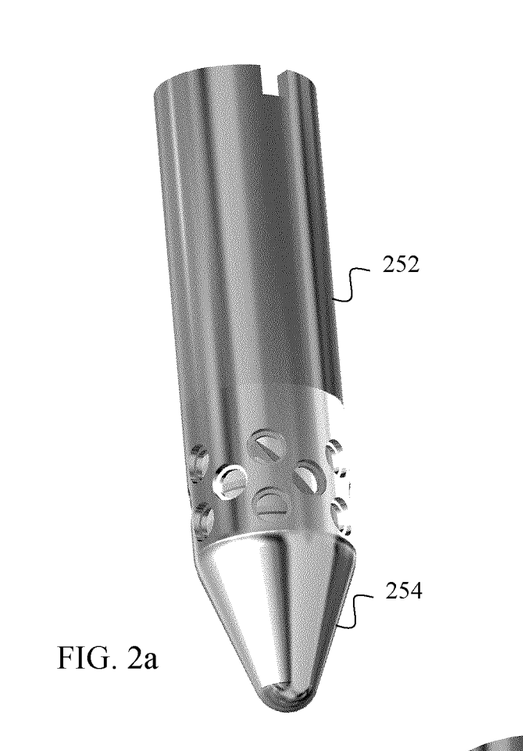
FIG. 2a is a perspective view of the electric field sensor unit, showing the tubular body portion and the conical cap.

The electric field sensor 202 and the SPU 300 may be disposed within a common housing or in separate housings. As shown in FIG. 2a, a common housing for the electric field sensor 202 and the SPU 300 may have a tubular body 252 and a sensor cover. The SPU 300 may be disposed within the body 252, and the electric field sensor 202 may extend from one end of the body 252. Preferably, the housing includes an external interface port for interfacing the SPU 300 with the sensor monitor 400 (via the local area network 102).

The sensor cover may include a conical cap 254, and an insulating cylindrical insert 256. The conical cap 254 is secured to the body 252 and encloses the end of the body 252 from which the electric field sensor 202 extends. Preferably, the conical cap 254 is fabricated from steel, and provides mechanical protection to the electric field sensor 202 and the SPU 300. The conical cap 254 may include apertures that allow water and oil to enter the housing and the conical cap 254, while also preventing naturally occurring earth material (sand, rock, soil, etc.) from covering the electric field sensor 202.

Figure 2B:
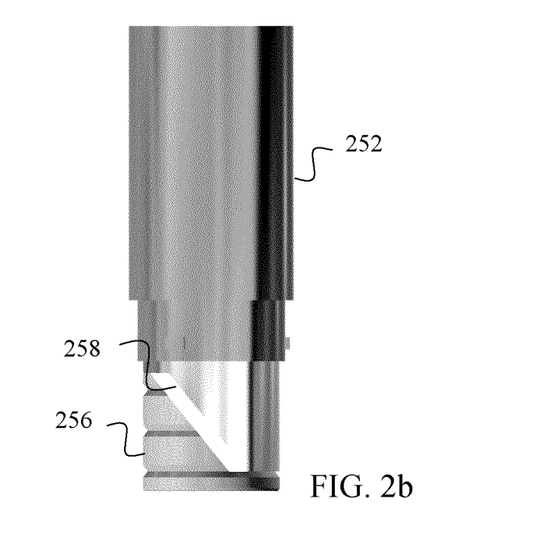
FIG. 2b is a side elevation of the electric field sensor unit, showing the cylindrical insert beneath the conical cap.
Figure 2C:
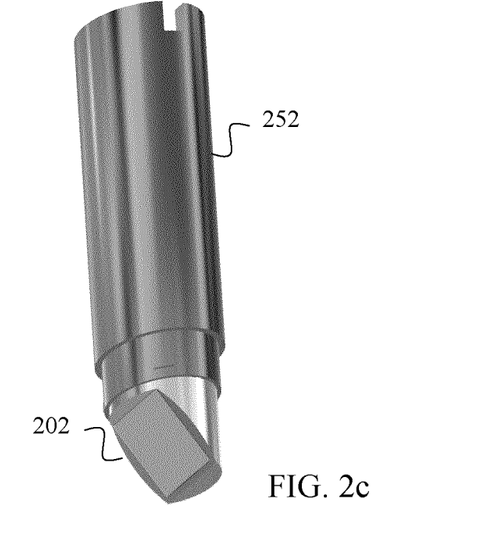
FIG. 2c is a perspective view of the housing of the electric field sensor unit, showing the electric field sensor beneath the cylindrical insert.

The cylindrical insert 256 is retained within the end of the body 252 by the conical cap 254. As shown in FIG. 2b, a small gap (detection region 258), provided between the cylindrical insert 256 and the electric field sensor 202, allows for the accumulation of water and oil as it enters from the conical cap 254. Preferably, the cylindrical insert 256 is fabricated from plastic and includes a plurality of channels that direct water and oil from the conical cap 254 to the electric field sensor 202.

For faster oil leak detection response times, the size of the detection region 258 may be selected to reduce the volume of oil that contacts the electric field sensor 202 for detection of a true oil event. Further, preferably the electric field sensor unit 200 includes an air vent (not shown), disposed internally or externally to the housing, that prevents an air lock from forming in the detection region 258 and instead allows oil to surround the electric field sensor 202 as air is vented through the air vent. As a result, when the electric field sensor unit 200 is embedded in the ground (preferably with the narrow end of the conical cap facing downwards), the electric field sensor 202 is typically in contact with air, water or oil, as opposed to soil, rock or clay.

Electric Field Sensor

Figure 3:
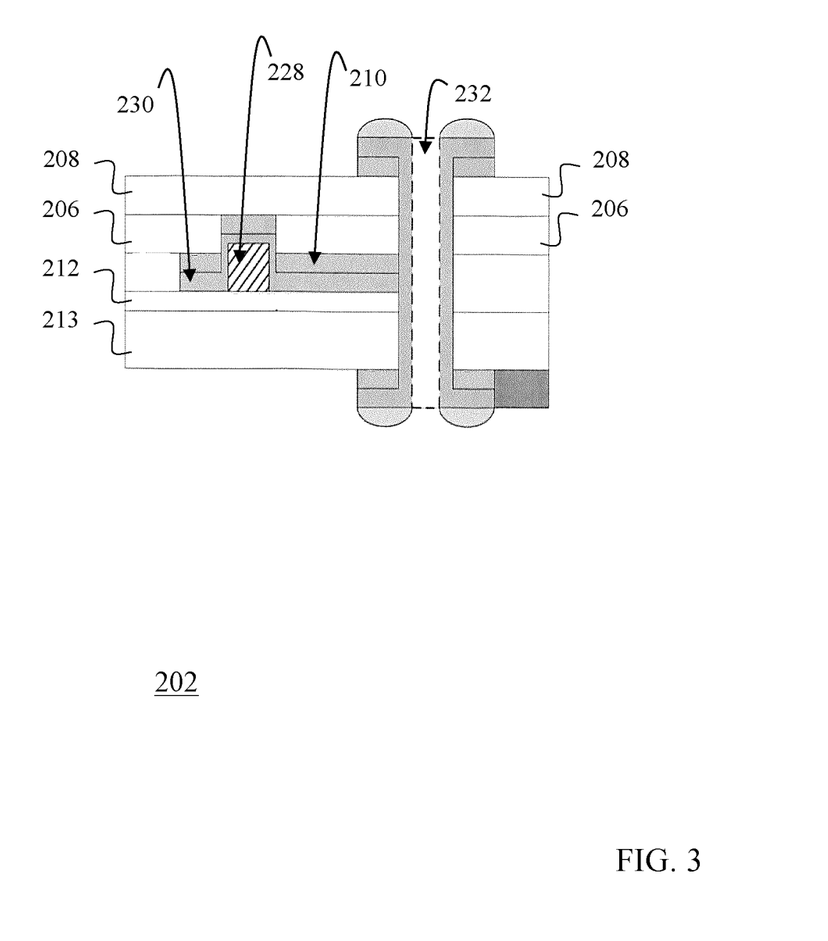
FIG. 3 is transverse cross-sectional view showing the various layers of the electric field sensor depicted in FIG. 1.

As shown in FIG. 3, the electric field sensor 202 comprises a substantially planar insulating upper substrate 206, and a plurality of electrodes that are embedded in the upper substrate 206. The electric field sensor 202 may also include a substantially planar insulating cap 208 that is disposed over the upper substrate 206. The insulating cap 208 may be laminated to the upper surface of the upper substrate 206 with an adhesive, such as an epoxy.

The upper substrate 206 may have a substantially rectangular configuration, and may comprise a non-conductive material, such as Teflon-based composite, although other non-conductive materials may be used. Preferably, the electrodes are substantially planar and are embedded in the upper substrate 206 using printed circuit board or integrated circuit manufacturing techniques. The insulating cap 208 may likewise have a substantially rectangular configuration and may comprise a PTFE composite, such as RT/Duroid® 5870.

Figure 4:
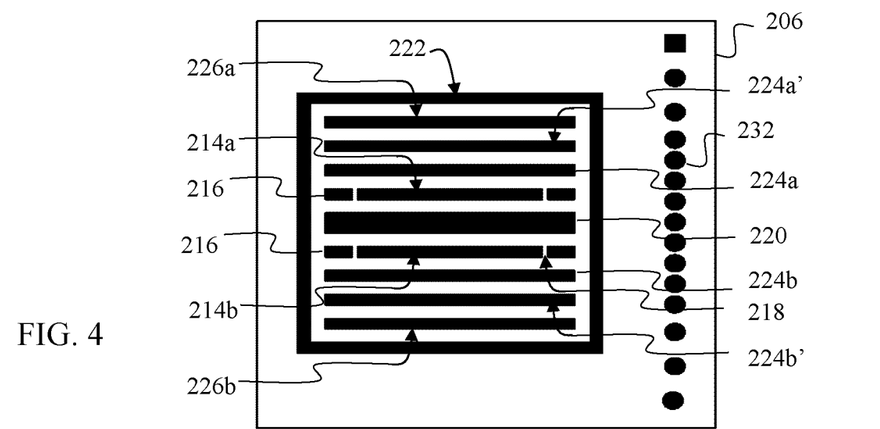
FIG. 4 is a bottom plan view of the upper substrate layer of the electric field sensor.

The electrodes include at least one elongate "sense" electrode and a plurality of elongate "source" electrodes. As will be discussed below, the SPU 300 applies a voltage signal to the sensor electrodes to thereby generate time-varying electric fields proximate the electric field sensor 202, and uses the sense electrodes and the sensor electrodes to detect/measure alternating current signals that are generated in the electric field sensor 202 by the time-varying electric fields.

The elongate sensor electrodes each have a pair of opposite ends, and are disposed around the sense electrode(s) in the upper substrate 206. The sense and sensor electrodes extend across the top surface of the upper substrate 206 in a substantially parallel fashion, such that the electrodes do not contact (i.e. are electrically isolated from) one another on the top surface of the upper substrate 206.

The electric field sensor 202 may include an elongate sense electrode having a pair of opposite ends, and a guard electrode embedded in the upper substrate 206 at opposite ends of the elongate sense electrode. Preferably, the electric field sensor 202 includes a pair of the elongate sense electrodes (first elongate sense electrode 214a, second elongate sense electrode 214b), and a plurality of "end" guard electrodes 216. The elongate sense electrodes 214a, 214b extend substantially parallel to each other in the upper substrate 206, and each end guard electrode 216 is disposed proximate a respective end of one of the elongate sense electrodes 214a, 214b. Further, the upper substrate 206 includes narrow non-conductive gaps 218 disposed between the end guard electrodes 216 and the ends of the sense electrodes 214a, 214b that electrically isolates the end guard electrodes 216 from the elongate sense electrodes 214a, 214b.

Preferably, one of the elongate sensor electrodes (the "centre" elongate sensor electrode 220) is disposed between and extends parallel to the elongate sense electrodes 214a, 214b in the upper substrate 206. Accordingly, the elongate sense electrodes 214a, 214b do not contact (i.e. are electrically isolated from) each other in the upper substrate 206, and the centre elongate sensor electrode 220 does not contact (i.e. is electrically isolated from) the elongate sense electrodes 214a, 214b in the upper substrate 206.

The centre elongate sensor electrode 220 may extend from the outermost end of the end guard electrodes 216 at one end of the elongate sense electrodes 214a, 214b to the outermost end of the guard electrodes 216 at the opposite end of the elongate sense electrodes 214a, 214b. Accordingly, the length of the centre elongate sensor electrode 220 may be substantially equal to the combined length of the elongate sense electrode 214a (or the elongate sense electrode 214b), the end guard electrodes 216 that are disposed at the ends of the elongate sense electrode 214a (elongate sense electrode 214b), and the non-conductive gaps 218 that are disposed between the elongate sense electrode 214a (elongate sense electrode 214b) and the associated end guard electrodes 216.

The electric field sensor 202 may include a continuous grounding conductor 222 that is embedded in the upper substrate 206 around the electrodes and in close proximity to the perimeter of the upper substrate 206. In addition to the centre elongate sensor electrode 220, the electric field sensor 202 may also include "outer" elongate sensor electrodes that are disposed laterally outwards from the elongate sense electrodes 214a, 214b in the upper substrate 206, between the elongate sensor electrodes and the grounding conductor 222. The outer elongate sensor electrodes extend substantially parallel to the elongate sense electrodes 214a, 214b in the upper substrate 206 and, therefore, do not contact (i.e. are electrically isolated from) the elongate sense electrodes 214a, 214b and the continuous grounding conductor 222 in the upper substrate 206.

The length of each of the outer elongate sensor electrodes may be substantially equal to length of the centre elongate sensor electrode 220 (and to the combined length of the elongate sense electrode 214a/214b, the end guard electrodes 216 that are disposed at the ends of the elongate sense electrode 214a/214b, and the non-conductive gaps 218 that are disposed between the elongate sense electrode 214a/214b) and the associated end guard electrodes 218). Accordingly, the continuous grounding conductor 222 may have a substantially rectangular shape in the upper substrate 206 as it extends around the elongate sense electrode 214a/214b, the end guard electrodes 216, and the centre elongate sensor electrode 220.

The electric field sensor 202 may include a first pair of the outer elongate sensor electrodes (first primary outer elongate sensor electrode 224a, first secondary outer elongate sensor electrode 224a') that are embedded in the upper substrate 206 between the first elongate sense electrode 214a and the grounding conductor 222, and a second pair of the outer elongate sensor electrodes (second primary outer elongate sensor electrode 224b, second secondary outer elongate sensor electrode 224b') that are embedded in the upper substrate 206 between the second elongate sense electrode 214b and the grounding conductor 222. As shown, the first secondary outer sensor electrode 224a' is disposed laterally outwards from the first primary outer elongate sensor electrode 224a in the upper substrate 206. Similarly, the second secondary outer sensor electrode 224b' is disposed laterally outwards from the second primary outer elongate sensor electrode 224b in the upper substrate 206.

The first pair of outer elongate sensor electrodes 224a, 224a' extend substantially parallel to each other in the upper substrate 206 and, therefore, are do not contact (i.e. are electrically isolated from) each other, the first elongate sense electrode 214a and the continuous grounding conductor 222 in the upper substrate 206. Similarly, the second pair of outer elongate sensor electrodes 224b, 224b' extend substantially parallel to each other in the upper substrate 206 and, therefore, do not contact (i.e. are electrically isolated from) each other, the second elongate sense electrode 214b and the continuous grounding conductor 222 in the upper substrate 206.

In addition to the end guard electrodes 216, the electric field sensor 202 may include elongate "outer" guard electrodes that are disposed laterally outwards from the outer elongate sensor electrodes 224a, 224b in the upper substrate 206, between the outer elongate sensor electrodes 224a, 224b and the grounding conductor 222. The outer elongate guard electrodes each have a pair of opposite ends, and extend substantially parallel to the outer elongate sensor electrodes 224a, 224b in the upper substrate 206 and, therefore, do not contact (i.e. are electrically isolated from) the outer elongate sensor electrodes 224a, 224b and the continuous grounding conductor 222 in the upper substrate 206.

The length of each of the outer guard electrodes may be substantially equal to length of the outer elongate sensor electrodes 224a, 224b and the centre elongate sensor electrode 220 (and to the combined length of the elongate sense electrode 214a/214b, the end guard electrodes 216 that are disposed at the ends of the elongate sense electrode 214a/214b, and the non-conductive gaps 218 that are disposed between the elongate sense electrode 214a/214b) and the associated end guard electrodes 218).

The electric field sensor 202 may include a first of the outer elongate guard electrodes (first outer elongate guard electrode 226a) embedded in the upper substrate 206 between the first secondary outer elongate sensor electrode 224a' and the grounding conductor 222, and may also include a second of the outer elongate guard electrodes (second outer elongate guard electrode 226b) embedded in the upper substrate 206 between the second secondary outer elongate sensor electrode 224b' and the grounding conductor 222.

The first outer elongate guard electrode 226a extends substantially parallel to the first secondary outer elongate sensor electrode 224a' in the upper substrate 206 and, therefore, does not contact (i.e. is electrically isolated from) the first secondary outer elongate sensor electrode 224*a*' and the continuous grounding conductor 222 in the upper substrate 206. Accordingly, with this configuration, the pair of parallel first outer elongate sensor electrodes 224*a* are disposed between the outer elongate guard electrode 226*a* and the first elongate sense electrode 214*a*.

Similarly, the second outer elongate guard electrode 226*b* extends substantially parallel to the second secondary outer elongate sensor electrode 224*b*' in the upper substrate 206 and, therefore, does not contact (i.e. is electrically isolated from) the second secondary outer elongate sensor electrode 224*b*' and the continuous grounding conductor 222 in the upper substrate 206. Accordingly, with this configuration, the pair of parallel second outer elongate sensor electrodes 224*b* are disposed between the outer elongate guard electrode 226*b* and the second elongate sense electrode 214*b*.

As discussed, the SPU 300 applies a voltage signal to the centre elongate sensor electrode 220 and to the outer elongate sensor electrodes 224 to thereby generate a time-varying electric field, and uses the elongate sense electrodes 214*a*, 214*b* and the sensor electrodes 220, 224 to detect/measure the alternating current signals that are generated in the electric field sensor 202 by the time-varying electric field. The end guard electrodes 216, the outer elongate guard electrodes 226 and the continuous grounding conductor 222 cooperate to substantially confine the penetration of the time-varying electric field to proximate the electric field sensor 202 (e.g. to the upper substrate 206 and through the detection region 258). Preferably, the interior shape of the cylindrical insert 256 of the sensor cover is substantially parallel to the upper surface of the insulating cap 208 so that the cylindrical insert 256 does not significantly enter the time-varying electric field generated by the electric field sensor 202.

As shown in FIG. 3, in addition to the upper substrate 206 and the insulating cap 208, the electric field sensor 202 may include a substantially planar first intermediate substrate 210 that is disposed below the upper substrate 206, and a substantially planar second intermediate substrate 212 that is disposed below the first intermediate substrate 210. As above, the first intermediate substrate 210 and the second intermediate substrate 212 may each have a substantially rectangular configuration, and may comprise a non-conductive material, such as a Teflon-based composite, although other non-conductive materials such as ceramic may be used. The first intermediate substrate 210 may be laminated to the lower surface of the upper substrate 206, the second intermediate substrate 212 may be laminated to the lower surface of the first intermediate substrate 210, with an adhesive, such as an epoxy.

The electric field sensor 202 may also include a backing layer 213 that is disposed below the second intermediate substrate 212 and serves to substantially confine the penetration of the varying electric field to the electric field sensor 202. The backing layer 213 may comprise a non-conductive material, such as a Teflon-based composite, and may be laminated to the lower surface of the second intermediate substrate 212.

The electric field sensor 202 also includes a plurality of conductive posts 228 that extend through the first intermediate substrate 210 (see FIGS. 3, 5), a plurality of conductive traces 230 that are disposed on the second intermediate substrate 212 (see FIGS. 3, 6), and a plurality of vias 232 that extend through the insulating cap 208, the upper substrate 206 and the first and second intermediate substrates 210, 212 (see FIGS. 3 to 7).

Figure 5:
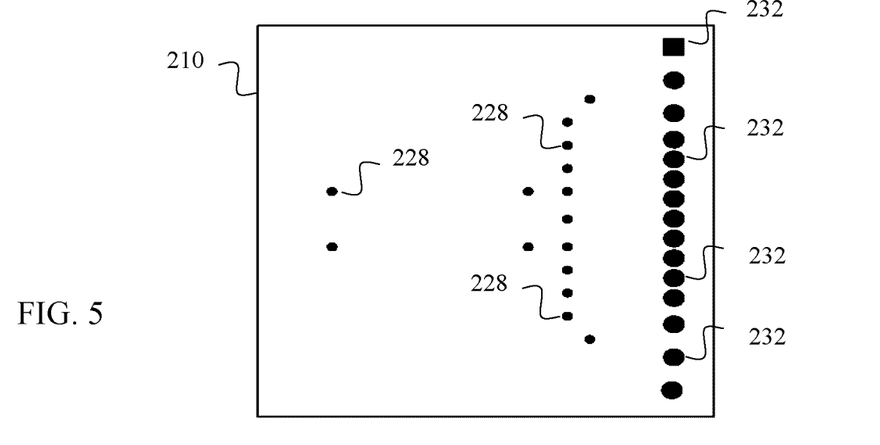
FIG. 5 is a bottom plan view of the first intermediate substrate layer of the electric field sensor.
Figure 6:
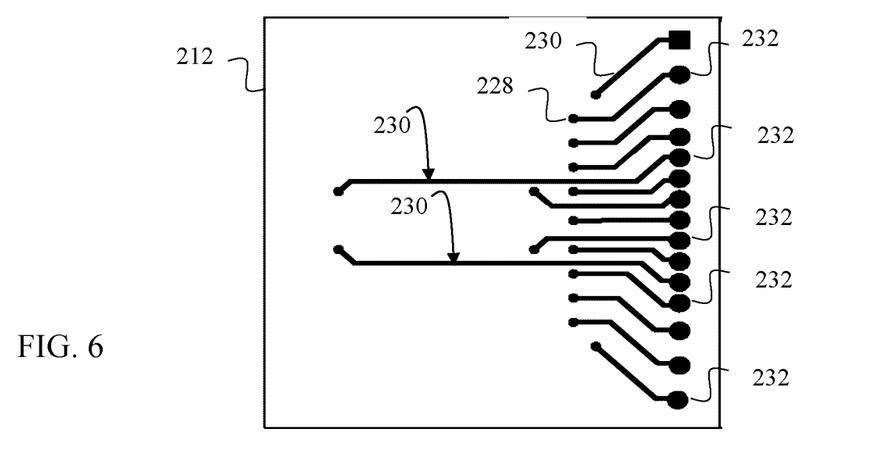
FIG. 6 is a bottom plan view of the second intermediate substrate layer of the electric field sensor.

The conductive posts 228 extend through the first intermediate substrate 210 at a substantially right angle to the upper and lower surfaces thereof, and into the upper substrate 206. Preferably the conductive traces 230 are substantially planar and are formed on the upper surface of the second intermediate substrate 212 using conventional printed circuit board or integrated circuit manufacturing techniques, although other processes such as silk screen printing on ceramic may be used.

Typically, each via 232 comprises a series of plated through-holes that are formed in each of the insulating cap 208, the upper substrate 206 and the first and second intermediate substrates 210, 212. The plated through-holes of each via 232 are vertically aligned with one other, such that when the insulating cap 208, the upper substrate 206 and the first and second intermediate substrates 210, 212 are laminated together, the plated through-holes of each via 232 form a respective continuous electrically-conductive path from the second intermediate substrate 212 through to the insulating cap 208.

Figure 7:
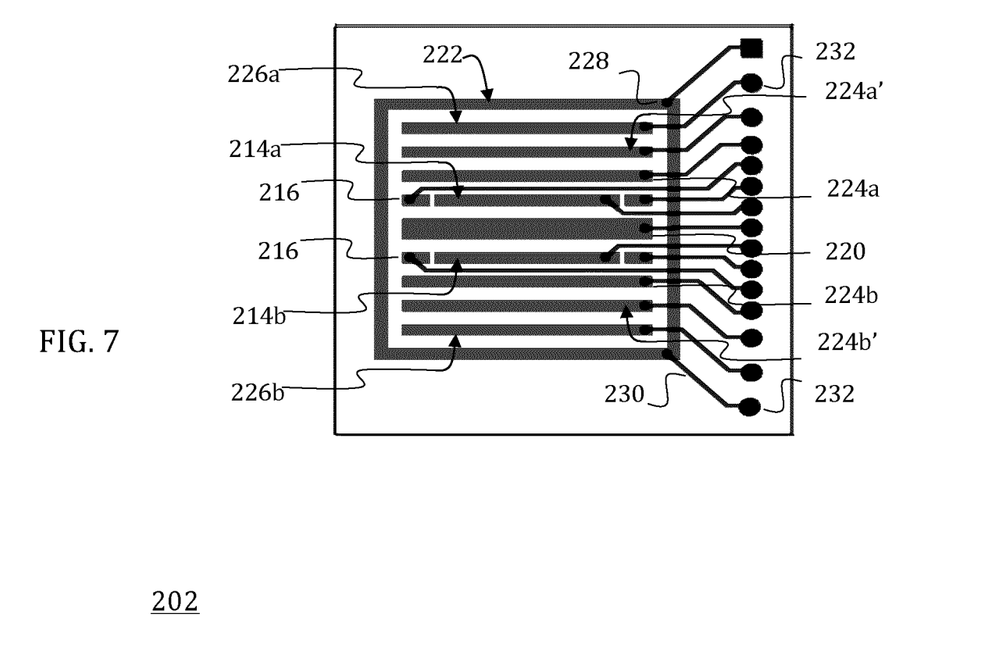
FIG. 7 is a plan view of the artefacts of the upper, first intermediate and second intermediate substrate layers.

FIG. 7 depicts the relative positions of the electrodes of the upper substrate 206, the conductive posts 228 of the first intermediate substrate 210, the conductive traces 230 of the second intermediate substrate 212, and the vias 232. As shown in FIGS. 5 and 7, each conductive post 228 is vertically aligned, and in electrical contact, with a respective one of the electrodes that are embedded in the upper substrate 206.

The conductive traces 230 of the second intermediate substrate 212 each have a pair of opposite ends, and extend along the upper surface of the second intermediate substrate 212. Accordingly, the conductive traces 230 are substantially parallel to the electrodes of the upper substrate 206, although the conductive traces 230 are obviously disposed in a separate plane from the electrodes.

As shown in FIGS. 6 and 7, one end of each conductive trace 230 is vertically aligned, and in electrical contact, with a respective one of the conductive posts 228 of the first intermediate substrate 210. The other end of each conductive trace 230 is in electrical contact with the plated through-hole (formed in the second intermediate substrate 212) of a respective one of the vias 232. Each via 232 extends at a substantially right angle from the associated conductive trace 230 in the second intermediate substrate 212 through to the insulating cap 208.

Signal Processing Unit

Figure 8:
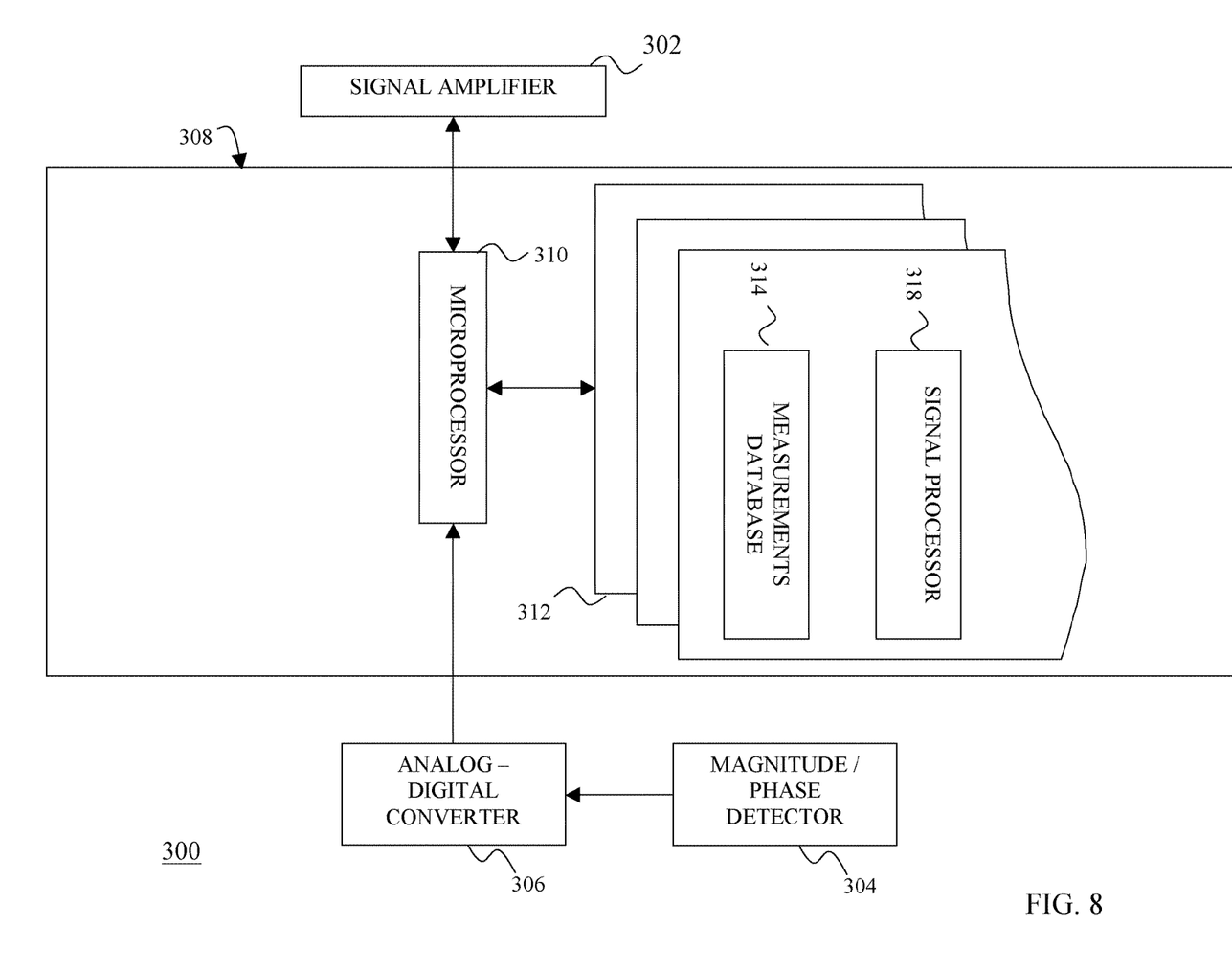
FIG. 8 is a schematic view of the structure of the signal processing unit of the electric field sensor unit.

As discussed, the SPU 300 generates alternating current signals in the electric field sensor 202, and generates assessments of the accumulation of substances proximate the electric field sensor 202 from the magnitude and phase of the alternating current signals. Accordingly, as shown in FIG. 8, preferably the SPU 300 includes a signal amplifier 302, an analog magnitude/phase detector 304, an analog-to-digital (A/D) converter 306, and a signal processing subsystem 308.

The signal amplifier 302 is connected to the signal processing subsystem 308, and to the guard electrodes 216, 226 and the sensor electrodes 220 of the electric field sensor 202. The signal amplifier 302 receives a time series of voltage signals from the signal processing subsystem 308, and applies a corresponding time-series of alternating current (AC) voltages to the guard electrodes 216, 226 and to the sensor electrodes 220, 224. The time-series of applied AC voltages produces a time-varying electric field at the electric field sensor 202 which, in turn, generates AC current signals in the sense electrodes 214 and in the sensor electrodes 220, 224. Preferably, the interior shape of the cylindrical insert 256 of the sensor cover is substantially parallel to the upper surface of the insulating cap 208 so that the cylindrical insert does not significantly enter the time-varying electric field generated by the electric field sensor 202.

The analog magnitude/phase detector 304 is coupled to the sense electrodes 214, the guard electrodes 216, 226, and the sensor electrodes 220, 224 via wires that extend between a respective signal input pin of the magnitude/phase detector 304 and a respective one of the vias 232. The magnitude/phase detector 304 senses the AC current signals that are generated in the sense electrodes 214 and in the sensor electrodes 220, 224 via the signal input pins, and generates analog magnitude and phase output signals by referencing the magnitude and phase of the AC current generated in the sense electrodes 214 and the sensor electrodes 220, 224 by the time-varying electric fields to the AC voltages applied to the guard electrodes 216, 226 and the sensor electrodes 220, 224. In effect, then, the analog signals output by the magnitude/phase detector 304 are complex analog admittance (magnitude and phase) signals.

The A/D converter 306 is coupled to the analog output of the magnitude/phase detector 304. The A/D converter 306 periodically samples, over a series of predetermined measurement time intervals, the analog magnitude and phase signals that are output by the magnitude/phase detector 304 during the associated measurement time interval, and outputs corresponding digital measurement data sets to the signal processing subsystem 308. Therefore, the measurements included in each measurement data set are complex digital admittance measurements (i.e. admittance magnitude measurements and admittance phase measurements).

The signal processing subsystem 308 is coupled to the signal amplifier 302 and the digital output of the A/D converter 306. The signal processing subsystem 308 is configured to apply a time-series of AC voltages to the guard electrodes 216, 226 and to the sensor electrodes 220, 224 of the electric field sensor 202 (via the signal amplifier 302) and to generate assessments of the accumulation of substances proximate the electric field sensor 202 from the complex digital admittance measurements that are output by the A/D converter 306.

As shown, the signal processing subsystem 308 may include one or more microprocessors 310 and a non-transitory computer-readable medium 312. The non-transitory computer-readable medium 312 is typically provided as electronic computer memory (e.g. flash memory), and maintains a measurements database 314 of one or more predetermined substance accumulation profiles.

Each substance accumulation profile comprises a set of complex admittance criteria (i.e. admittance magnitude criteria and admittance phase criteria) that are uniquely associated with a particular substance. As a non-limiting example, each substance accumulation profile may include one or more sets of admittance magnitude criteria and/or admittance phase criteria that are uniquely associated with the accumulation of a hydrocarbon, such as oil, proximate any of the electric field sensor units 200. The set(s) of complex admittance criteria in each substance accumulation profiles may be predetermined experimentally and/or via computer modelling, and may be stored in the computer-readable medium 312 prior to installation of the electric field sensor unit 200 at a substance monitoring location.

As non-limiting examples, the complex admittance criteria may comprise a range of admittance magnitude values and/or a range of admittance phase values uniquely associated with a substance of interest. The complex admittance criteria may comprise sets of the ranges of admittance magnitude values and/or the admittance phase values. The complex admittance criteria may comprise a rule set derived from a mathematical function of the admittance magnitude values and/or the admittance phase values.

As discussed below, the SPU 300 of each electric field sensor unit 200 may apply a time series of sets of AC voltages to the associated electric field sensor 202. Accordingly, the complex admittance criteria may comprise a ratio value derived from (i) the admittance magnitude values produced by one set of the applied AC voltages and (ii) the admittance magnitude values produced by another set of the applied AC voltages. The complex admittance criteria may comprise a ratio value derived from (i) the admittance phase values produced by one set of the applied AC voltages and (ii) the admittance phase values produced by another set of the applied AC voltages. The complex admittance criteria may comprise sets of admittance magnitude ratios and/or admittance phase ratios. The complex admittance criteria may comprise a rule set derived from a mathematical function of the admittance magnitude ratios and/or the admittance phase ratios.

The computer-readable medium 312 may also maintain computer processing instructions stored thereon which, when executed by the microprocessor(s) 310, implement a signal processor 318 that is configured to apply a time-series of alternating current (AC) voltages to the guard electrodes 216, 226 and to the sensor electrodes 220, 224 of the electric field sensor 202 (via the signal amplifier 302), and to receive (via the analog magnitude/phase detector 304 and the A/D converter 306) at least one measurement data set comprising a complex admittance measurement of a phase and a magnitude of a current generated in the sense electrodes 214 and the sensor electrodes 220, 224 in response to the applied AC voltages.

The measurements in each measurement data set will vary in accordance with the physical/chemical characteristics of the substances proximate the electric field sensor unit 200. Accordingly, in effect, the electric field sensor 202 provides the SPU 300 with periodic data samples that are indicative of the characteristics of a substance that has accumulated proximate the electric field sensor unit 200.

The signal processor 318 is also configured to generate an assessment of the accumulation of a substance proximate the electric field sensor 202 from a correlation of the measurement data set(s) with at least one of the predetermined substance accumulation profiles of the measurements database 314. The signal processor 318 may generate the assessment of the accumulation of the substance by comparing the sets of complex admittance measurements received from the A/D converter 306 with the sets of predetermined complex admittance criteria stored in the measurements database 314.

As will be explained, preferably the amplitude and frequency of each AC voltage applied to the guard electrodes 216, 226 and to the sensor electrodes 220, 224 remains constant throughout the time-series. Similarly, preferably the phase of each AC voltage applied to the guard electrodes 216, 226 also remains constant throughout the time-series. However, the phase of the AC voltage applied to the sensor electrodes 220, 224 may change with each group of signals of the time-series.

The time-series of AC voltages is selected to render the sets of complex admittance measurements received from the A/D converter 306 (and the sets of predetermined complex admittance criteria stored in the measurements database 314) distinctive of the accumulation of a substance of interest, such as a hydrocarbon. The inventors have determined that this result can be attained by applying to the centre elongate sensor electrode 220 (throughout the time-series of voltages) an AC voltage (via the SPU 300) that is of the same amplitude and phase as the AC voltage applied to the first primary outer elongate sensor electrode 224a and the second primary outer elongate sensor electrode 224b, and is of the same amplitude but opposite phase to the AC voltage applied to the first secondary outer sensor electrode 224a' and the second secondary outer sensor electrode 224b'. Further, preferably the AC voltage applied to the end guard electrodes 216 (throughout the time-series of voltages) is of the same amplitude but opposite phase to the AC voltage applied to the first and second outer elongate guard electrodes 226a, 226b.

If/when the signal processor 318 detects an accumulation of a substance of interest proximate the electric field sensor 202, the signal processor 318 is also configured to generate an alarm signal that identifies the electric field sensor unit 200. Preferably, the signal processor 318 is configured to detect an accumulation of a liquid hydrocarbon proximate the electric field sensor unit 200, and to generate an alarm signal that identifies the electric field sensor unit. The signal processor 318 is also configured to transmit the alarm signal to the sensor monitor 400.

After detecting an accumulation of, for example, a liquid hydrocarbon proximate the associated electric field sensor 200, the signal processor 318 generates an alarm signal that identifies the electric field sensor unit 200. The SPU 300 then transmits the alarm signal to the sensor monitor 400, at step S806.

Although the signal processor 318 is typically implemented as computer processing instructions, all or a portion of the functionality of the signal processor 318 may be implemented instead in dedicated electronics hardware, such as a field programmable logic gate array (FPGA) or a complex programmable logic device (CPLD).

Sensor Monitor

Figure 9:
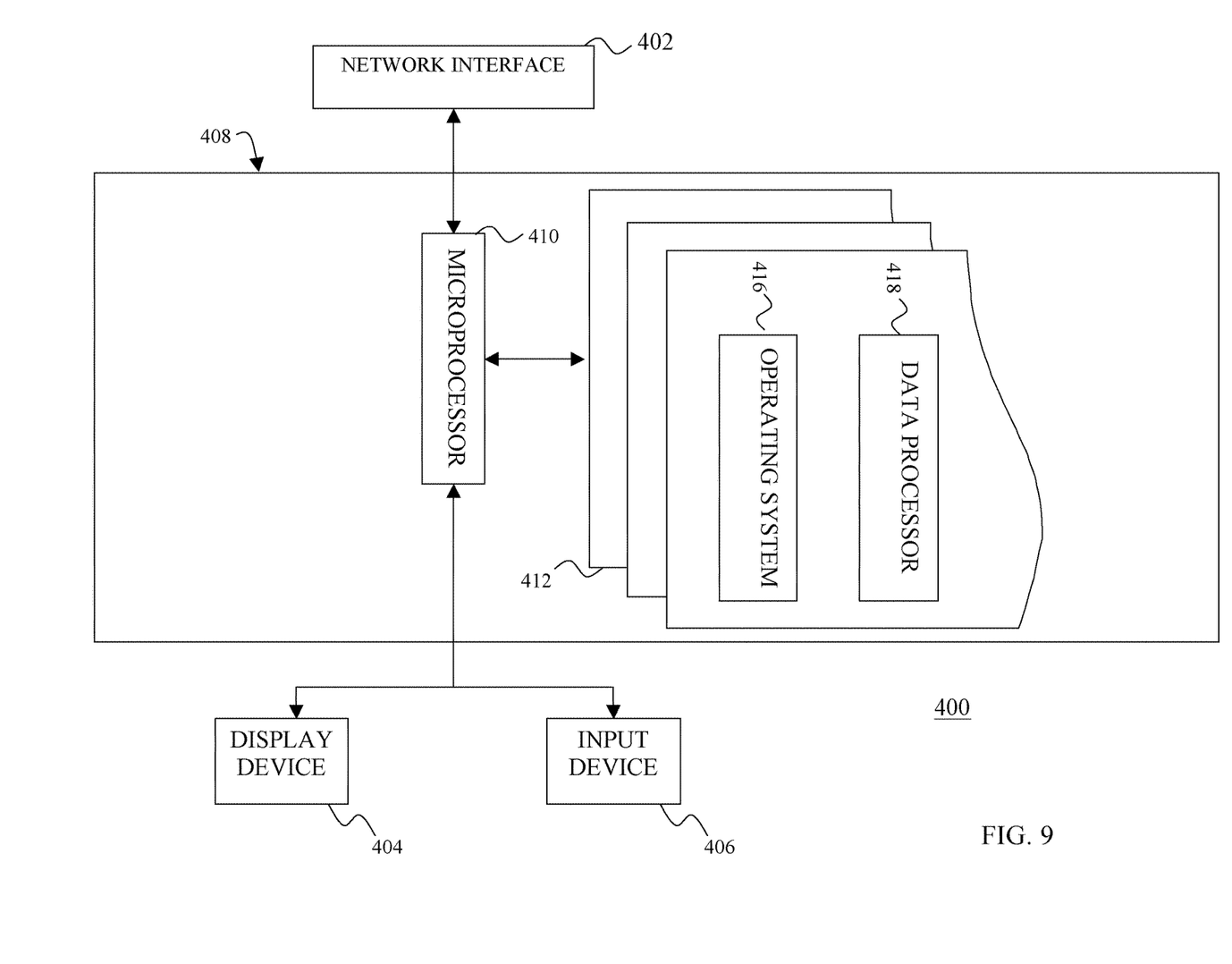
FIG. 9 is a schematic view of the structure of the sensor monitor.

The sensor monitor 400 is coupled to the electric field sensor unit(s) 200 via the local area network 102. As shown in FIG. 9, the sensor monitor 400 includes a network interface 402, a display device 404, a user input device 406, and a data processing system 408 that is coupled to the network interface 402, the display device 404, and the user input device 406. The network interface 402 interfaces the sensor monitor 400 with the local area network 102 and allows the sensor monitor 400 to communicate with the SPU(s) 300 of the electric field sensor unit(s) 200. The user input device 406 may be provided as a keyboard and/or a touch-sensitive layer provided on the display device 404.

The data processing system 408 may include one or more microprocessors 410 and a non-transitory computer-readable medium 412. The non-transitory computer-readable medium 412 may be provided as electronic computer memory (e.g. flash memory) or optical or magnetic memory (e.g. compact disc, hard disk). The computer-readable medium 412 maintains computer processing instructions stored thereon which, when executed by the microprocessor(s) 410, define an operating system that controls the overall operation of the sensor monitor 400.

The computer processing instructions may also implement a data processor 418 that monitors for alarm signals from the electric field sensor unit(s) 200, and generates an alarm message on the display device 404 if the data processor 418 determines from an alarm signal received from one of the electric field sensor units 200 that the determined accumulation of a substance proximate the electric field sensor unit 200 exceeds a predetermined process limit.

Pipeline Breach Monitor: Method of Operation

Figure 10:
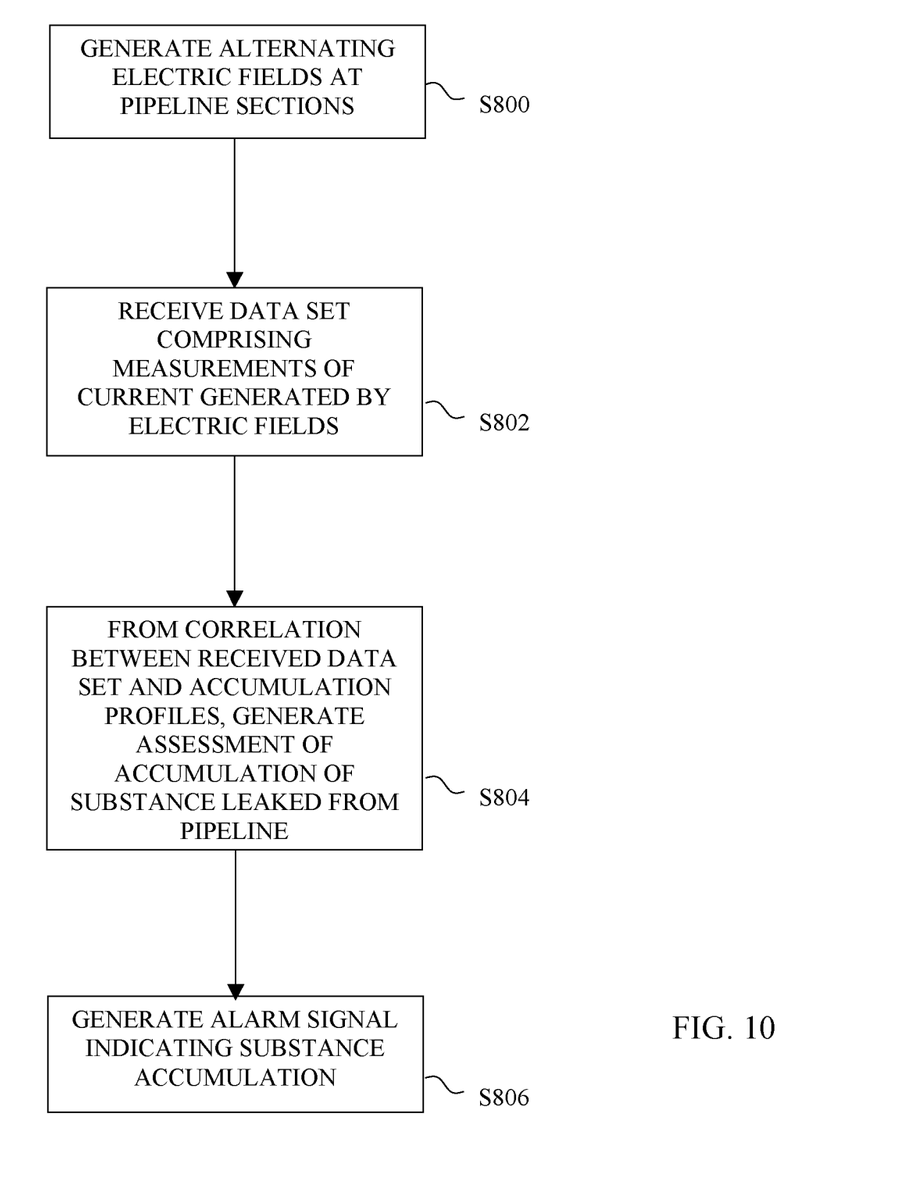
FIG. 10 is a flow-chart depicting the method of operation of the pipeline breach monitor.

The method of operation of the pipeline breach monitor 100 will now be described with reference to FIG. 10. As discussed above, the pipeline breach monitor 100 typically includes a plurality of the electric field sensor units 200. Each electric field sensor unit 200 is deployed underground proximate a respective section of pipeline to monitor for the accumulation of a liquid hydrocarbon, such as oil, which may have leaked or been discharged from the respective section of pipeline.

At step S800, the pipeline breach monitor 100 generates alternating electric fields proximate each section of the pipeline. To do so, the SPU 300 of each electric field sensor unit 200 applies a time-series of AC voltages to the guard electrodes 216, 226 and to the sensor electrodes 220, 224 of the associated electric field sensor 202.

Preferably, the time-series of AC voltages (and the sets of predetermined complex admittance criteria stored in the measurements database 314) is selected to render the sets of complex admittance criteria generated by the electric field sensor units 200 distinctive of the accumulation of oil. The inventors have determined that this result can be attained by applying to the sensor electrodes 220, 224 (via each SPU 300) two sets of AC voltages, and alternating between each set of AC voltages after a measurement time interval of 200 ms (i.e. switching between the two sets of AC voltages every 200 ms).

As discussed, preferably the amplitude and phase of the AC voltages applied to the guard electrodes 216, 226 remain unchanged throughout the time-series. Further, preferably the amplitude of the AC voltages applied to the sensor electrodes 220, 224 remain constant throughout the time-series. However, the respective phases of the AC voltages applied to the sensor electrodes 220, 224 is different for each set of AC voltages, as shown in Table 1 below:

TABLE 1

| Electrode | Set A | Set B |
| --- | --- | --- |
| grounding conductor 222 | GND | GND |
| outer guard electrode 226a | + | + |
| outer sensor electrode 224a' | + | − |
| outer sensor electrode 224a | − | + |
| end guard electrode 216 | − | − |
| centre sensor electrode 220 | − | + |
| end guard electrode 216 | − | − |
| outer sensor electrode 224b | − | + |
| outer sensor electrode 224b' | + | − |
| outer guard electrode 226b | + | + |

The relative positions of the end guard electrodes 216, the outer elongate guard electrodes 226 and the continuous grounding conductor 222, as described above, together with the alternating sets of AC voltages identified in Table 1 above, cooperate to substantially confine the penetration of the time-varying electric field to proximate the electric field sensor 202 so as to limit the sensitivity of the electric field sensor 202 to the accumulation of substances distal from the insulating cap 208.

At step S802, the SPU 300 of each electric field sensor unit 200 receives from the associated electric field sensor 202 one or more measurement data sets, each comprising a measurement of the complex admittance of the current generated in the respective electric field sensor 202. To do so, the signal processor 318 of each SPU 300 may periodically transmit read commands to the associated A/D converter 306, requesting measurement data sets from the A/D converter 306. Alternately, the A/D converter 306 of each SPU 300 may periodically transmit the measurement data sets to the associated signal processor 318, without waiting for a read command from the signal processor 318. As noted above, the complex admittance measurements in each measurement data set varies in accordance with the physical/chemical characteristics of the substances proximate each electric field sensor unit 200.

At step S804, the signal processor 318 generates an assessment of the substance(s) if any, that has accumulated proximate each electric field sensor 200 (i.e. the substances that have leaked or been discharged from the respective sections of the pipeline). To do so, the signal processor 318 may query the measurements database 314 with the complex admittance measurements of the received measurement data set(s), and identify the substances (if any), that have accumulated proximate each electric field sensor 200 from a correlation between the complex admittance measurements of the received measurement data set(s) and the complex admittance criteria of the accumulation profiles stored in the measurements database 314.

After detecting an accumulation of, for example, a liquid hydrocarbon proximate the associated electric field sensor 200, the signal processor 318 generates an alarm signal that identifies the electric field sensor unit 200. The SPU 300 then transmits the alarm signal to the sensor monitor 400, at step S806.

If the determined accumulation of a substance along any section of the pipeline exceeds a predetermined process limit, the sensor monitor 400 may display on the display 404 of the sensor monitor 400 an alarm message that identifies the electric field sensor unit 200 and the accumulated substance.

We claim:

1. A pipeline breach monitor comprising:
an electric field sensor comprising a substantially planar insulating upper substrate, and a plurality of electrodes embedded in the upper substrate, the electrodes being substantially parallel to each other in the upper substrate and comprising at least one sense electrode and a plurality of elongate sensor electrodes disposed around the at least one sense electrode; and
a signal processing unit in communication with the electric field sensor, the signal processing unit being configured to apply a voltage signal to the sensor electrodes and to receive at least one measurement set comprising a measurement of a phase and a magnitude of an alternating current generated in the at least one sense electrode and the sensor electrodes in response to the applied voltage signal, the signal processing unit being further configured to generate an assessment of accumulation of a substance proximate the electric field sensor from a correlation of the at least one measurement set with at least one predetermined substance accumulation profile.

2. The pipeline breach monitor according to claim 1, wherein the at least one sense electrode comprises an elongate sense electrode, and the electric field sensor comprises a guard electrode embedded in the upper substrate at opposite ends of the elongate sense electrode.

3. The pipeline breach monitor according to claim 2, wherein the electric field sensor comprises a pair of the at least one elongate sensor electrodes substantially parallel to each other, and one of the elongate sensor electrodes is parallel to and disposed between the elongate sense electrodes.

4. The pipeline breach monitor according to claim 2, wherein the electric field sensor comprises a continuous grounding conductor embedded in the upper substrate around the electrodes, and at least one elongate guard electrode embedded in the upper substrate between the elongate sensor electrodes and the grounding conductor, parallel to the sensor electrodes.

5. The pipeline breach monitor according to claim 4, wherein the electric field sensor is configured to generate a series of time-varying electric fields from the voltage signal, and the guard electrode and the grounding conductor are configured to substantially confine the electric fields to proximate the electric field sensor.

6. The pipeline breach monitor according to claim 4, wherein the electric field sensor comprises a pair of the elongate guard electrodes, a pair of the elongate sense electrodes substantially parallel to each other, one pair of the elongate sensor electrodes substantially parallel to each other and disposed between one of the elongate guard electrodes and one of the elongate sense electrodes, and another pair of the elongate sensor electrodes substantially parallel to each other and disposed between another of the elongate guard electrodes and another of the elongate sense electrodes.

7. The pipeline breach monitor according to claim 1, further comprising a substantially planar first intermediate substrate disposed below the upper substrate, and a plurality of conductive posts extending through the first intermediate substrate, the conductive posts each being in electrical contact with a respective one of the electrodes.

8. The pipeline breach monitor according to claim 7, wherein the electric field sensor further comprises a substantially planar second intermediate substrate disposed below the first intermediate substrate, and a plurality of conductive traces disposed on the second intermediate substrate, the plurality of conductive traces each being in electrical contact with a respective one of the conductive posts and extending parallel to the plurality of electrodes.

9. The pipeline breach monitor according to claim 8, wherein the electric field sensor further comprises a substantially planar insulating top substrate disposed over the plurality of electrodes, and a plurality of vias each being in electrical contact with a respective one of the conductive traces and extending through the top, upper and intermediate substrates.

10. The pipeline breach monitor according to claim 1, wherein the electric field sensor is configured to generate a series of time-varying electric fields from the voltage signal, the series of time-varying electric fields being configured to render the at least one measurement set distinctive of the accumulation of a particular substance.

11. The pipeline breach monitor according to claim 10, wherein the substance is a hydrocarbon.

12. The pipeline breach monitor according to claim 11, wherein the substance is oil.

13. The pipeline breach monitor according to claim 10, wherein each said substance accumulation profile comprises a set of predetermined complex admittance criteria, and the signal processing unit is configured to determine complex admittances from the voltage signal and a phase and magnitude of an alternating current generated in the electric field sensor by the time-varying electric fields, and to generate the assessment of accumulation of a substance from a comparison of the determined complex admittances with the predetermined complex admittance criteria.

14. A method of monitoring for pipeline breach, comprising the steps of:
a pipeline breach monitor generating time-varying electric fields in a region beneath a section of pipeline, the pipeline breach monitor comprising an electric field sensor and a signal processing unit in communication with the electric field sensor, the electric field sensor comprising a substantially planar insulating upper substrate and a plurality of electrodes embedded in the upper substrate, the electrodes being substantially parallel to each other in the upper substrate and comprising at least one sense electrode and a plurality of elongate sensor electrodes disposed around the at least one sense electrode, the signal processing unit generating the time-varying electric fields by applying a voltage signal to the sensor electrodes;

the signal processing unit receiving at least one measurement set comprising a measurement of a phase and a magnitude of an alternating current generated in the at least one sense electrode and the sensor electrodes from the time-varying electric fields;

the signal processing unit generating an assessment of accumulation of a substance discharged from pipeline from a correlation of the at least one measurement set with at least one predetermined substance accumulation profile.

15. The method according to claim 14, wherein the generating the time-varying electric fields comprises the electric field sensor generating a series of the time-varying electric fields from the voltage signal, the series of time-varying electric fields being configured to render the at least one measurement set distinctive of the accumulation of a particular substance.

16. The method according to claim 15, wherein each said substance accumulation profile comprises a set of predetermined complex admittance criteria, and the generating an assessment of accumulation of a substance comprises the signal processing unit determining complex admittances from the voltage signal and a phase and magnitude of an alternating current generated in the sense electrodes and the sensor electrodes by the generated electric field, and generating the assessment from a comparison of the determined complex admittances with the predetermined complex admittance criteria.

* * * * *